United States Patent

[11] 3,618,880

| [72] | Inventors | Edward A. Hagaman<br>Bellevue;<br>Lyle F. Stayner, Seattle; Sherman M. Bissell, Seattle, all of Wash. |
|---|---|---|
| [21] | Appl. No. | 36,042 |
| [22] | Filed | May 11, 1970 |
| [45] | Patented | Nov. 9, 1971 |
| [73] | Assignee | The Boeing Company<br>Seattle, Wash. |

[54] SPEED BRAKE SYSTEM FOR AIRCRAFT SPOILERS
11 Claims, 10 Drawing Figs.

[52] U.S. Cl. .................................................. 244/113, 244/42 D
[51] Int. Cl. ..................................................... B64c 9/34
[50] Field of Search............................................ 244/113, 110, 77 V, 42 R, 42 D, 103, 111

[56] References Cited
UNITED STATES PATENTS

| 2,410,855 | 11/1942 | Koppen......................... | 244/42 D |
| 2,788,186 | 4/1957 | Wilson ......................... | 244/111 |
| 3,339,866 | 9/1967 | Paluka et al. ................. | 244/113 |

Primary Examiner—Milton Buchler
Assistant Examiner—Paul E. Sauberer
Attorney—Christensen, Sanborn & Matthews

ABSTRACT: A system for allowing automatic or overriding manual actuation of an aircraft's spoilers as an airspeed brake includes a speed brake lever disposed adjacent the pilot whose movement is coupled to a spoiler actuator by suitable mechanical linkage and a logic means which receives inputs from a reverse thrust sensor, a forward thrust sensor, a ground contact sensor, and the speed brake lever. The logic means combines these inputs according to a predetermined schedule to accordingly provide a deploy or a retract output signal to an electrical actuator which in turn provides a mechanical movement which is coupled to the spoiler actuator and to the speed brake lever by another mechanical linkage. The inputs and predetermined schedule allows for automatic deployment of the spoilers as a speed brake under normal landing, abnormal landing, and refused takeoff maneuvers, and allows automatic retraction of the spoilers during any go-around or refused landing maneuver. An embodiment of each of the system elements is illustrated and described as is an embodiment of a mechanical coupler between the spoiler actuator, the electrical actuator, and the speed brake lever, which coupler provides priority to movements of the speed brake lever over those of the electrical actuator.

SPEED BRAKE SYSTEM FOR AIRCRAFT SPOILERS

BACKGROUND OF THE INVENTION

This invention relates to a means for decelerating aircraft and, more particularly, to such a means including an improved system for actuating the spoilers of an aircraft as a speed brake during landing, takeoff, and other ground maneuvers.

Since the earliest days of flying, many devices have been proposed and utilized which assist in the deceleration of an aircraft upon landing or touchdown. Besides the commonly used wheel brakes, there have been many braking devices which include a hinged flap or vane which is retracted into a position in which it offers little or no resistance to airflow during normal flight and which is extended following touchdown to provide an impedance to airflow and thus to aid in deceleration. These devices, known as airspeed brakes, may be mounted on the fuselage of the aircraft but more commonly comprise a portion of the wing surface.

In the earliest embodiments of speed brakes, the flaps were extended by means of a simple mechanical stored-energy system which was triggered by contact of a sensing mechanism with the ground. It has also been known to use similar flaps or vanes during flight. These devices are called "spoilers" and are extended from their normally concealed position in the wing to modify the aerodynamic characteristic thereof. Recently, the functions of a speed brake and a spoiler have been combined in a single device under control of a more sophisticated system which allows the pilot to actuate the vanes into a fully extended position upon touchdown, and which also provides automatic extension of the vanes after touchdown. This system generally includes a speed brake lever which is disposed on the control stand of the aircraft adjacent the thrust control levers. When the speed brake lever is in a locked or retracted position, the vanes cannot be actuated. When the pilot raises the lever from its locked position and rotates it to an extended position, a suitable actuating means is energized to fully extend the vanes. When the pilot places the speed brake lever in an intermediate or armed position, the system provides a signal to the actuating means only when touchdown is assured, such as by a sensor detecting ground contact.

There are perhaps four ground maneuvers of the aircraft in which actuation of the spoilers as a speed brake is helpful. These maneuvers are normal landing, abnormal landing a refused takeoff, and a go-round or refused landing. With the prior systems, the pilot either may manually actuate the speed brake by rotation of the speed brake lever after touchdown, or may provide for automatic actuation of the speed brake by placing the speed brake lever in the armed position, whereupon the speed brakes are extended upon the sensing of ground contact.

However, during an abnormal landing situation in which the pilot does not have sufficient time to place the speed brake lever in the armed position, he must rely upon his memory and judgment in manually actuating the speed brakes after touchdown. The advantages of the automatic system are thus lost under conditions in which they are most needed, for it is certain that time will be lost between the time the pilot learns of ground contact and the time that he initiates spoiler actuation by rotating the speed brake lever. This lost time may be critical in an abnormal landing maneuver since the length of the run needed to bring the aircraft to rest is increased in proportion thereto.

The third landing maneuver is refused takeoff, such as under emergency conditions when a safe takeoff is not possible, and the pilot decides to abort the maneuver or is prevented from its execution. This situation is even more critical than the abnormal landing situation, especially as the plane has already traveled some distance down the runway. Therefore, since the pilot probably has not placed the speed brake lever in the armed position, he must actuate the speed brakes by manually rotating the speed brake lever. Again, the time lost results in increased stopping distance for the aircraft.

Finally, in the go-around maneuver, in which the pilot has landed but is unable to bring the aircraft to safe stop, and desires to place the aircraft once more in an airborne condition, the prior system may well be a detriment, for the pilot must, in addition to the other manifold activities that are required to place the aircraft in flight, such as rotation of the thrust levers, also rotate the speed brake lever to its retracted position.

Therefore, the deficiencies noted above the prior automatic speed brake systems have greatly limited their usefulness and pilot acceptance. The result has been some tragedies, or near tragedies, Which could have been avoided by the use of an effective, completely automatic, and foolproof speed brake system.

There has been proposed one device which comprises an automatic speed brake system responsive solely to rotation of two or more wheels of the aircraft upon ground contact. Although this system does not have to be armed, and thus provides acceptable operations during the abnormal landing maneuver, it cannot be used during the refused takeoff and go-around maneuvers, for ground contact is predominant throughout and therefore the speed brakes will be extended unless manually retracted.

It is therefore an object of this invention to provide a system for automatically actuating the spoilers of an aircraft during normal and abnormal landing situations, and during refused takeoff and refused landing situations.

It is yet a further object of this invention to provide such a system which furnishes a positive safeguard against inadvertent spoiler actuation because of electrical or mechanical equipment failures.

It is another object of this invention to provide such a system which automatically extends the spoilers during certain maneuvers, whether or not the pilot has previously placed the automatic speed brake lever in an armed position.

It is another object of this invention to provide such a system in which positive manual actuation of the speed brake lever overrides the automatic operation of the system under any circumstances.

SUMMARY OF THE INVENTION

These objects and others, which will be realized from consideration of the detailed discussion in the following portion of the specification, are obtained, briefly, by means linking the spoiler actuators with the speed brake lever and an electrical actuator, and a logic means controlling the position of the electrical actuator in response to signals obtained from engine thrust lever position sensors, a ground contact sensor, and a speed brake lever arming sensor, wherein the liking means provides for override of the electrical actuator position by rotation of the speed brake lever.

BRIEF DESCRIPTION OF THE DRAWINGS

The subject matter of this invention is particularly pointed out and distinctly claimed in the concluding portion of the specification. For a detailed description thereof, together with further objects and advantages thereof, reference should be made to the following portion of the specification taken in conjunction with the accompanying drawings in which:

BRIEF DESCRIPTION OF A PREFERRED EMBODIMENT

Figure 1:
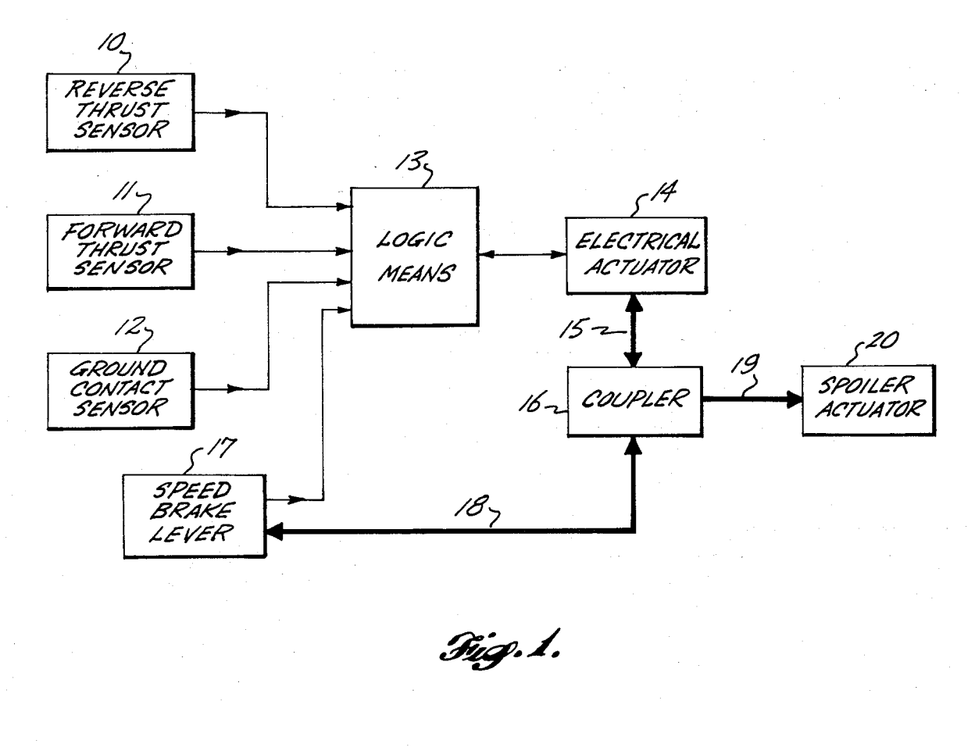
FIG. 1 is a block diagram of the system of this invention.

Now referring to FIG. 1, the system is seen to comprise a reverse thrust sensor 10, a forward thrust sensor 11, and a ground contact sensor 12, which provide appropriate control signals to a logic means 13. The control signals provided by these sensors 10-12 are chosen to comprise sufficient input formation to logic means 13 so that automatic deployment of the aircraft spoilers as a speed brake may occur under normal landing, abnormal landing, and refused takeoff maneuvers, and so that automatic retraction of the spoilers occurs during any go-around or refused landing maneuver. Specifically, a reverse thrust control signal is provided by sensor 10 when one or more of the aircraft's jet engines is controlled to provide reverse thrust. A forward thrust control signal is provided by sensor 11 when two or more of the aircraft's jet engines have been controlled to provide a forward thrust greater than a predetermined value, and no forward thrust control signal when their thrust is set below that value. A ground contact control signal is provided by sensor 12 when the aircraft's landing gear have positively engaged the ground upon touchdown.

Logic means 13 includes appropriate logic and gating circuitry so that the control signals from sensors 10-12, and an "armed" signal hereinafter to be described, are combined according to a predetermined schedule which allows for automatic deployment or retraction of the spoilers during the four aforementioned landing maneuvers. When the spoilers are to be either deployed or retracted, logic means 13 supplies a deploy or retract output signal to an electrical actuator 14 which converts the output signal into a corresponding mechanical movement. This mechanical movement is connected to a coupler 16 by means of a mechanical linkage 15. The mechanical movement of a speed brake lever 17 which is disposed within reach of the pilot is also connected to coupler 16 by a second mechanical linkage 18. The function of coupler 16 is to simply allow the spoilers to be deployed or retracted in response to the mechanical movements of either electrical actuator 14 or speed brake lever 17, and to give the mechanical movements of speed brake lever 17 priority over those of electrical actuator 14.

Coupler 16 in turn provides an output signal or mechanical movement which is connected to a spoiler actuator 20 by a third mechanical linkage 19. In one embodiment, spoiler actuator 20 may comprise two sets of hydraulic motors or other devices, one set for each wing of the aircraft. These sets are directly under control of the mechanical movement of coupler 16 as transmitted by mechanical linkage 19. In another embodiment, linkage 19 may additionally include a mixing device which additionally has as an input a mechanical movement of a spoiler control device which determines the degree of deployment of the spoilers during flight conditions.

As can be noted from FIG. 1, the combination of the mechanical linkages 15 and 18 and coupler 16 provides that the electrical actuator 14 take the position of the mechanical movement of speed brake lever 17, and vice versa, except under conditions when both the electrical actuator 14 and speed brake lever 17 are attempting to control the position of the spoilers, at which time the mechanical movement of speed brake lever 17 has priority.

The "armed" signal previously mentioned may be taken from speed brake lever 17 and is preferably provided when that lever is rotated from its locked or retracted position by an incremental amount. Of course, the "armed" signal may also be obtained from mechanical linkage 18 or coupler 16, as long as the mechanical movement of speed brake lever 17 can be sensed.

It should be cautioned at this point that although the outputs of actuator 14 and lever 17 and elements 15-20 have been described in terms of mechanical movements and devices, this invention is not limited thereto. In appropriate cases, the outputs of actuator 14 and lever 17 may comprise appropriate hydraulic or electrical control signals, and elements 15-20 corresponding hydraulic or electrical connections and devices. Mechanical movements devices have been discussed predominantly because of the ease of adapting the automatic speed brake control system of this invention to existing mechanical speed brake controls.

As discussed previously, the automatic speed brake control system of this invention automatically extends the spoilers as a speed brake at touchdown, or upon an aborted or refused takeoff, whether or not the speed brake lever 17 has been placed in an armed position. In addition, the system provides retraction of the spoilers when a refused landing or go-around maneuver is initiated by the pilot after touchdown. In this manner, the effort required of the pilot and the demands on his time are lessened, the braking effectiveness of the system is greatly increased, and the speed brake operation is always proper during the aforementioned landing maneuvers. Finally, minimum stopping distances for abnormal landings and refused takeoffs are assured.

To assure this system performance, logic means 13 preferably provides deploy ro retract output signals to electrical actuator 14 according to the following predetermined schedule:

| Maneuver | Logic means 13 | |
|---|---|---|
| | Input control signals | Output signal |
| Normal landing | Armed | Deploy |
| | Forward thrust | |
| | Ground contact | |
| Abnormal landing | Armed | Deploy |
| | Forward thrust | |
| | Ground contact | |
| | Reverse thrust | |
| Refused takeoff | Armed | Deploy |
| | Forward thrust | |
| | Ground contact | |
| | Reverse thrust | |
| Go-around | Forward thrust | Retract |

It can be easily be seen from this tabulation that there must be concurrence of three conditions in order for the spoilers to be automatically deployed as a speed brake, whereas, only one condition is required for automatic retraction thereof. As mentioned previously, the pilot at all times is able to manually override the actions of the automatic system. In this manner, positive safeguards are designed into the system so that inadvertent speed brake deployment or retraction is unlikely, whereas, desired deployment and retraction is positively assured. As is well known, further safeguards may be designated into this system, as by redundancy of components, so that the system will correctly function despite the failure or misoperation of one or more of its element.

A more complete understanding of the invention can perhaps be had by referring to the following description of one embodiment of each of the system elements illustrated in FIG. 1. This description, taken in conjunction with FIGS. 2—7, will illustrate further the system safeguards mentioned above, mentioned above, as well as show examples of redundancy and system design. However, it is to be clearly understood by those skilled in the art that the system invention is not limited thereto, and in fact may apply to any combination of similar elements in the manner suggested in FIG. 1 and its accompanying description.

Figure 2:
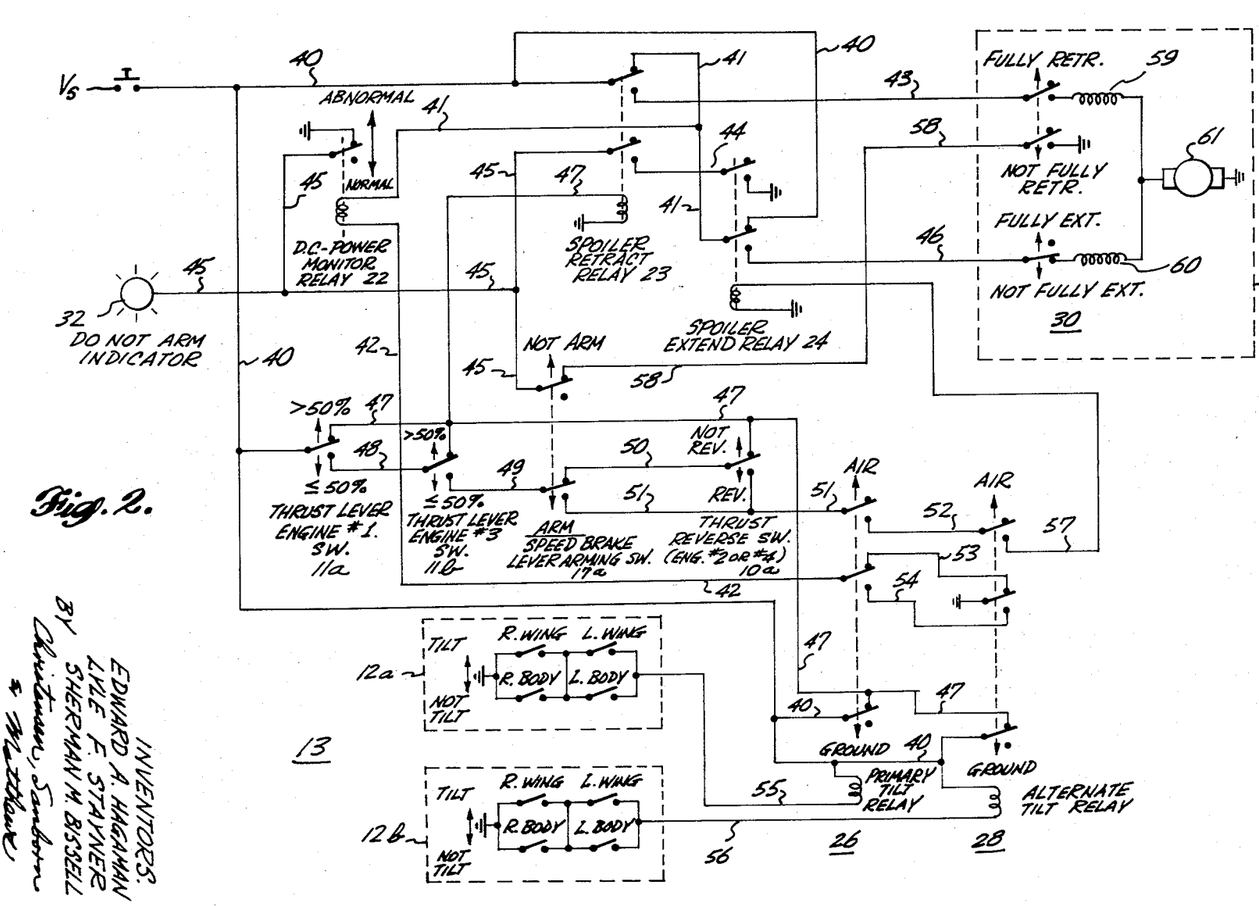
FIG. 2 is a schematic diagram of one embodiment of the logic means, sensors, and electrical actuator of this invention.

In FIG. 2, an embodiment of sensors 10-12, the logic means 13, and electrical actuator 14 is shown. While this embodiment uses relay and switch logic, the present state of the art would allow a skilled designer to use solid-state logics, such as diode, resistor-transistor (RTL), diode-transistor (DTL), or the like. The relay contacts illustrated therein are shown in the normally deenergized position.

A voltage $V_s$ which is used as supply voltage for the electrical actuator 14 and as a control voltage for the sensors 10–12 and logic means 13 is applied via a lead 40 to a first movable contact of a spoiler retract relay 23, to a first stationary contact of a spoiler extend relay 24, to a movable contact of a thrust lever engine No. 1 switch 11a, to a first movable contact of a primary tilt relay 26, to a first movable contact of an alternate tilt relay 28, and to one side of the coils of relays 26 and 28. Through the first movable contact of relay 23 and the first stationary contact of relay 24, DC power is thus available for connection to the electrical actuator 14. Through the movable contact of switch 11a, DC power is available for the logic functions of means 13 associated with sensors 11, 10 and the armed signal from speed brake lever 17. Finally, through relays 26 and 28, DC power is made available for the ground contact sensor 12.

A first stationary contact associated with the first movable contact of relay 23 is connected by a lead 41 to a first movable contact of relay 24 associated with the first stationary contact thereof, and to one side of a coil of a DC power monitor relay 22. The other side of that coil is connected by a lead 42 to ground potential by means of a second movable contact of relay 26, and either of leads 53 and 54 connected between the stationary contacts associated therewith and the stationary contacts associated with a second movable contact of relay 28.

Relay 22 performs two functions: the first, to see whether or not DC power is being applied to the system by means of lead 40, the second, to indicate a system malfunction if both retract relay 23 and extend relay 24 are energized at the same time. The stationary contact of relay 22 is connected to ground potential and a movable contact thereof is connected by a lead 45 to one side of an indicating lamp whose other side is connected to a DC voltage supply, not shown. If DC power is being applied to the system by lead 40, that power is coupled to the coil of relay 22 by lead 41 so that the ground connection to lead 45 is broken, thereby extinguishing lamp 32. If, however, there is no DC power so applied, relay 22 is deenergized thereby making the ground connection and lighting lamp 32. Similarly, if both relay 23 and relay 24 are energized simultaneously, the connection between leads 40 and 41 is broken and lamp 32 is lit.

Lamp 32, in addition to indicating these system malfunctions, provides a "do not arm" indication to the pilot under certain conditions. Specifically, lead 45 is connected to a second movable contact of relay 23 and to a first movable contact of a speed brake lever arming switch 17a which is switched between arm and not arm positions, depending on whether or not the speed brake lever has been rotated from its retract position by an incremental amount. A stationary contact associated with the second movable contact of relay 23 is connected to a second movable contact of relay 24 whose associated stationary contact is connected to ground potential. In a similar manner, a stationary contact associated with the first movable contact of 17a is connected by a lead 58 to a switch within actuator 14 which has connected thereto ground potential. This switch, which will be discussed in more detail hereinafter, is a limit switch which is open only when the electrical actuator has produced a mechanical movement corresponding to full retraction of the spoiler.

The connection of lead 45 to ground potential by means of the second set of stationary and movable contacts of relays 23 and 24 and lead 44 provides a backup to the indication provided by relay 22 with respect to simultaneous energization of the retract and extend relays 23, 24. The connections of lead 45 via the first contact set of 17a, lead 58, and the switch within actuator 14 provides that lamp 32 is lit to indicate a "do not arm" condition whenever the electrical actuator is not fully retracted, because of malfunction or otherwise.

The generation of extend or retract output signals is accomplished by the remaining circuitry of FIG. 2. A first stationary contact associated with movable contact of switch 11a is connected by a lead 47 to one end of the coil of spoiler retract relay 23 whose other end is connected to ground potential. Lead 47 also connects a first stationary contact of a thrust lever engine No. 3 switch 11b, a stationary contact of a reverse thrust switch 10a, and the stationary contacts associated with the first movable arms of primary and alternate tilt relays 26 and 28 to the coil of spoiler retract rely 23.

Switches 11a and 11b form part of forward thrust sensor 11 and each includes two stationary contacts and thus two positions of the movable contact thereof. Each switch has its movable contact mechanically linked to the thrust control lever for one of the jet engines of the aircraft. As will be explained more fully with respect to the embodiment of FIG. 7, these movable contacts are in the upper position in FIG. 2 when the engine thrust lever is set to produce engine thrust greater than 50 percent of that rated. The movable contacts are in the lower position when the corresponding engine thrust lever is set to produce less than or equal to 50 percent of rated thrust. Of course, the exact amount of forward thrust is not critical. Rather, it is required that the switches 11a and 11b be positively actuated for some value of forward thrust which is less than the minimum required for takeoff under all environmental conditions.

It should be noted that when the movable contacts are in the upper position, the signal appearing on line 47 comprises the forward thrust control signal. Therefore, if either the engine No. 1 or engine No. 3 thrust levers are advanced to settings greater than 50 percent rated thrust the control signal on line 47 is applied to the retract relay 23 to accordingly supply a retract signal to electrical actuator 14. Such a situation corresponds to the go-around maneuver previously described.

The lower or second stationary contact of switch 11a is connected via a lead 48 to the movable contact of switch 11b, and the lower stationary contact of switch 11b is connected via a lead 49 to a second movable contact of the arming switch 17a. The first stationary contact of switch 17a is connected by a lead 50 to a movable contact of the reverse interlock switch 10a, and a second stationary contact thereof is connected by a lead 51 to a lower stationary contact of switch 10a and to a third movable contact of primary tilt relay 26.

If the movable contact of either the switch 11a and 11b is in the upper or greater than 50 percent position, then retract relay 23 is energized. If both are in the lower position, then the voltage $V_s$ is coupled by a lead 49 to switch 17a. If a speed brake lever is in the retracted position, the first and second movable contacts of switch 17a are in the upper or "not arm" position. When the speed brake lever has been rotated incrementally, and thereafter throughout its rotation, the first and second movable contacts of switch 17a are on the lower or "arm" position.

When switch 17a is in the "not arm" position, the signal on line 49 is coupled by a lead 50 to the movable contact of switch 10a; when switch 17a is in the "arm" position, the signal on line 49 is coupled by a lead 51 directly to the third movable contact of primary tilt relay 26.

Figure 5:
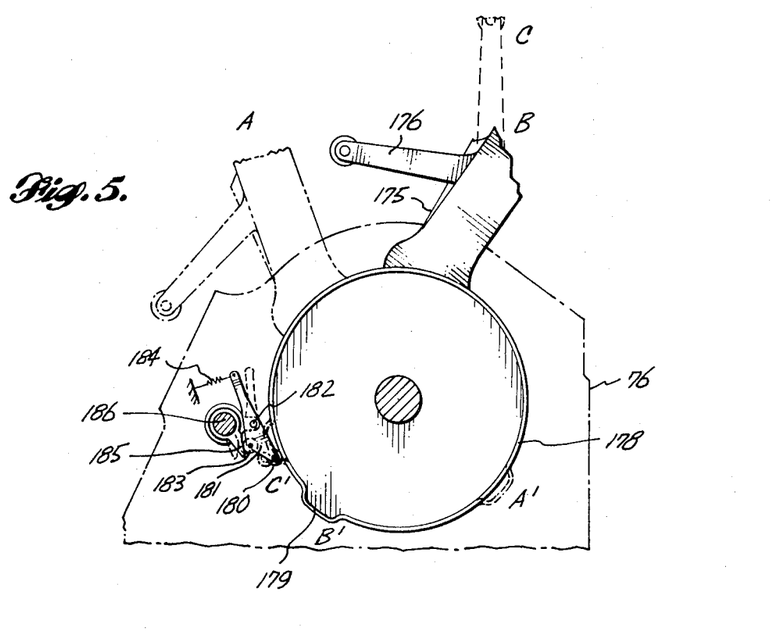
FIG. 5 is a section view of the aircraft control stand showing the construction and operation of a portion of one of the engine thrust lever sensors.
Figure 6A:
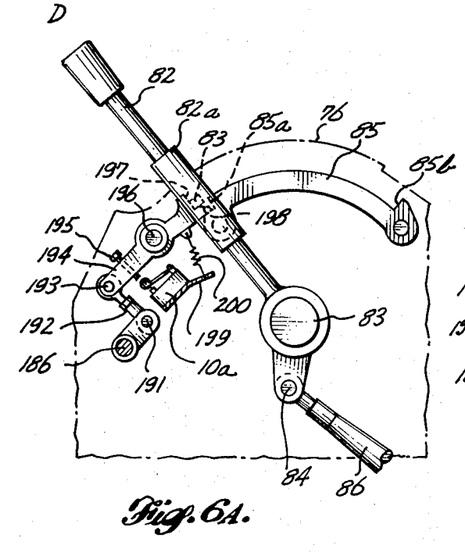
FIG. 6A, 6B, and 6C are section views of the control stand, showing the remaining construction and operation of the engine thrust lever sensor and the various positions of the speed brake lever during the manual and automatic system operation.
Figure 6B:
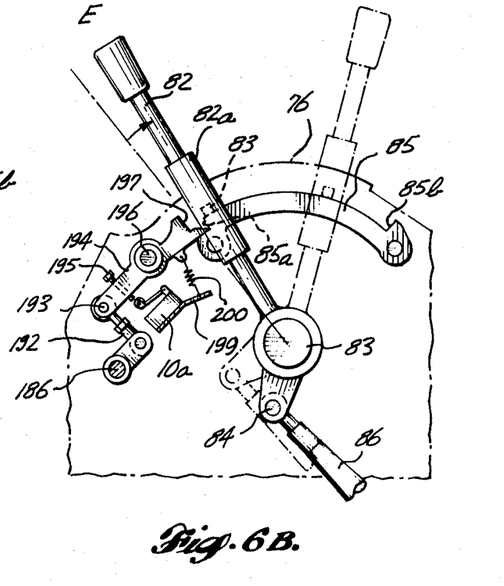
Figure 6C:
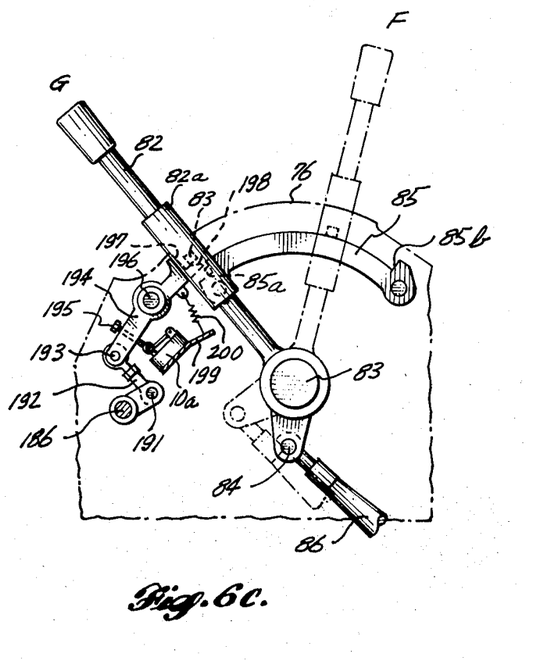

The movable contact of switch 10a is moved between an upper, or not reverse thrust, position, and a lower, or reverse thrust, position by suitable mechanical linkage connected to the thrust control levers of either of two of the jet engines of the aircraft. For purposes of safety, these engines are chosen to be different than those which provide control movements to switches 11a and 11b. A suitable mechanical linkage for actuating switch 10a is shown in FIGS. 5 and 6 and described hereinafter.

If the speed brake lever has not been rotated to the arm position, and neither engine is set for reverse thrust, then any signal appearing on line 49 is coupled via leads 50 and 57 to insure that spoiler retract relay 23 is energized to provide a retract signal to actuator 14. This connection assures that completely automatic operation of the spoilers, that is, without the pilot rotating the speed brake lever to the arm position, cannot occur if the none of the thrust control levers are placed in the reverse thrust position. Therefore, for the abnormal landing and refused takeoff maneuvers, merely reducing the thrust of the engines below 50 percent cannot result in deployment of the spoilers as a speed brake.

If the arming switch 17a is in the "arm" or lower position, the signal on line 49 is coupled to primary tilt relay 26. If the arming switch 17a is in the "not arm" position, the signal on line 49 can be coupled to relay 26 only if the switch 10a is in the reverse thrust or lower position. The first situation corresponding to the normal landing maneuver, and the second to the abnormal landing and refused takeoff maneuvers.

The stationary contact associated with the third movable contact of tilt relay 26 is coupled by a lead 52 to a third movable contact of alternate tilt relay 28. Its associated stationary contact is connected by a lead 57 to one end of the coil of spoiler extend relay 24 whose other end is coupled to ground potential. Therefore, if a signal does appear on line 51, spoiler deployment occurs if both relays 26 and 28 are actuated. If should be noted that extend relay 24 cannot supply DC power to actuator 14 unless retract relay 23 is deenergized by virtue of lead 41. If either of relays 26 and 28 is not actuated, the signal obtained from $V_s$ via line 40 is coupled through the corresponding first movable contact of either relay 26 or 28 to lead 47 to insure that retract relay 23 is energized to supply a retract signal to actuator 14. This connection is a backup to that provided by the third contact sets of relays 26 and 28.

As previously mentioned, the voltage supply $V_s$ appearing on line 40 is coupled to one end of the coils of relays 26 and 28. The other end of the coil of relay 26 is coupled by a lead 55 to a primary portion 12a of ground contact sensor 12, and the other end of coil of relay 28 is coupled via a lead 56 to an alternate portion 12b of ground contact sensor 12. Included in portions 12a and 12b are a source of ground potential which is connected to the corresponding lead 55 or 56 only if certain combinations of mechanical switches therein are actuated upon ground contact. Specifically, the movable contacts of these gear switches are disposed on or otherwise mechanically linked with the landing gear of the aircraft. As indicated in FIG. 2, the gear switches are open when the landing gear is in the flight or tilt position. As soon as the landing gear engages the ground and is rotated to the ground or not tilt position, the switches are closed. In practice, mounting the switches so that they operate in conjunction with the landing gear position has proved to be the most practical and foolproof way to provide a ground contact control signal.

In multicarriage aircraft, wherein landing gear is provided on either wing and either side of the fuselage or body thereof, further assurance of ground contact cab be made by requiring that contact be made on both sides of the aircraft. Thus, in FIG. 2, ground potential is connected to lead 55 only if one of the wing or body gear switches on one side of the aircraft and one of the wing or body gear switches on the other side of the aircraft are simultaneously placed in the not tilt or closed position. For example, a ground contact control signal is provided when the right wing and left wing, or right wing and left body, gear switches are closed. The gear switches in 12a and 12b are identical and serve to provide redundancy of ground contact indication, since both relays 26 and 28 must be actuated before a signal appears on line 57 for resultant actuation of extend relay 24.

The second or lower stationary contact associated with the first movable contact of relay 23 is coupled by a lead 43 to a first movable contact of limit switch 30 in actuator 14, and the second or lower stationary contact associated with the first movable contact of extend relay 24 is coupled by a lead 46 to a third movable contact of limit switch 30. The second movable contact of switch 30 is connected to lead 58 as heretofore described.

The stationary contact associated with the first movable contact of switch 30 is connected to a retract field coil 59 which is in turn connected in series with an armature 61 and ground potential. The stationary contact associated with the third movable contact of switch 30 is connected by an extend field coil 60 and armature 61 to ground potential. Coils 59, 60 and 61 form the basis of the electrical actuator 54. A shaft movement within armature 61 corresponds to the aforementioned mechanical movement of the actuator which is coupled by mechanical linkage 15 to coupler 16. Limit switch 30 removes the signals from logic means 13 appearing on lines 43 and 46 when the shaft of armature 61 has moved to a position corresponding to either a fully retracted or a fully extended position of the spoilers. If the electrical actuator is not fully retracted, ground potential is provided via lead 58, switch 17a and lead 45 to light indicating lamp 32 so that the pilot is warned not to arm the speed brake lever.

Although the actuator 14 and its accompanying control relays 23 and 24 have been described in terms of DC operation, it is to be clearly understood that this portion of the system could as well comprise an AC motor and AC control circuits therefor. The relay and switch system illustrated in FIG. 2 is but one way to convert the various combination of control signals from the sensors 10–12 and the arming signal from the speed brake lever 17 into movement of the electrical actuator 14 which corresponds to a desired extension or retraction of the aircraft's spoilers for use as a speed brake.

Figure 3:
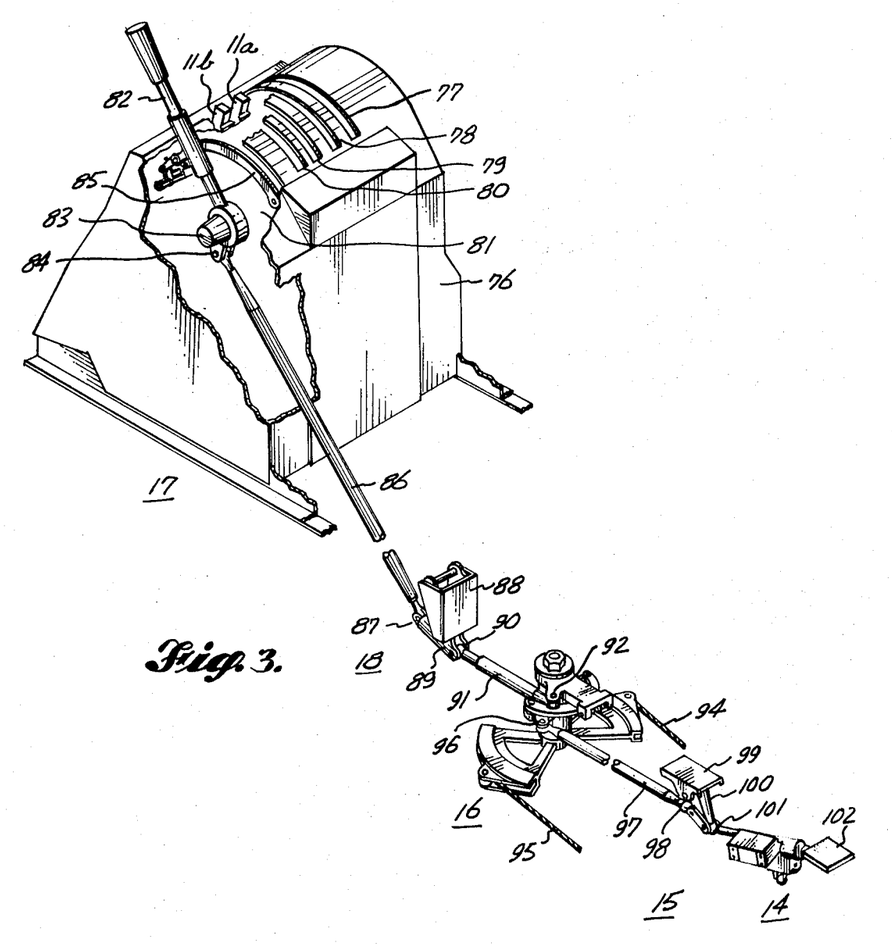
FIG. 3 is a pictorial diagram illustrating the mechanical configuration of the speed brake lever, the electrical actuator, and the linking means.

In FIG. 3, one way of converting the mechanical movements of the speed brake lever 17 and the electrical actuator 14 into desired movements of the spoiler actuator 20 is illustrated. A control stand 76 is disposed adjacent the pilot in the aircraft and includes a plurality of slots 77–80 in a top surface thereof through which extend the engine thrust control levers, not shown. This construction is well known to the art and needs no further description. A fifth slot 81 is also provided through which projects a speed brake handle 82 which is pivotally supported at 83 for rotation throughout the extend of slot 81. When lever 82 is at its farthest counterclockwise position in FIG. 3, the spoilers are fully retracted and when lever 82 is at its farthest clockwise position in FIG. 3, the spoilers are fully extended or deployed as a speed brake. Lever 82 is designed for rotation in conjunction with an arcuate guide 85 which extends throughout the slot 81.

The motion of handle 82 about pivot 83 is connected to the coupler 16 by a linkage 18 which includes a pivot point 84 connected to lever 82. Rod 86 connects pivot 84 to a first pivot point 87 of a link 89 which is in turn pivoted about a stationary flange 88 affixed to the frame of the aircraft. A second pivot point 90 of link 89 has connected thereto a rod 91 which terminates at a first pivot point 92 of the coupler 16.

Figures 4, 4A:
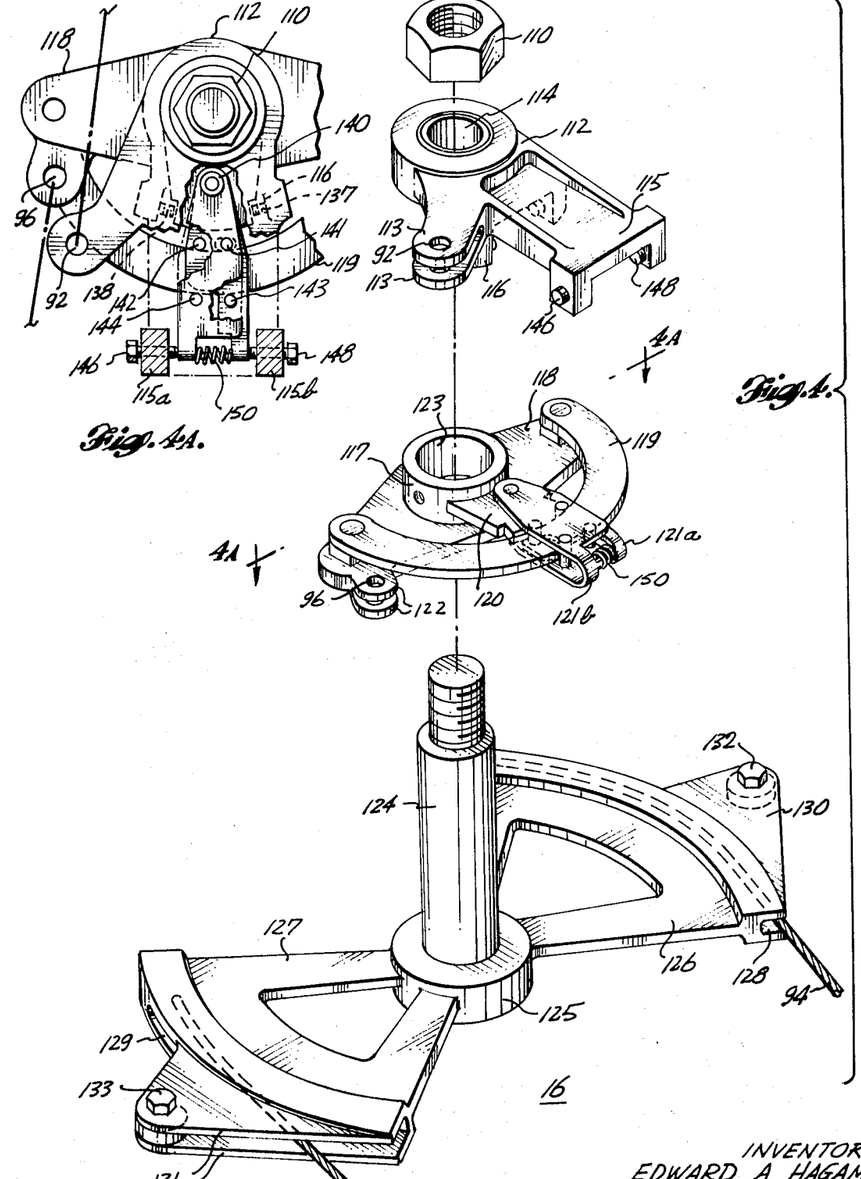
FIG. 4 is an exploded pictorial diagram of one element of the linking means.
FIG. 4A is a plan view of a portion of that element.

An embodiment for coupler 16 is illustrated in FIG. 4 and discussed in more detail hereinafter. Outputs therefrom appear on cables 94 and 95 which form part of linkage 19 and which are in turn connected to hydraulic actuators in either wing of the aircraft.

A second input to coupler 16 is provide at a pivot point 96 which has connected thereto a rod 97. A second link 100 has a first pivot point 98 connected to rod 97 and a second pivot point 101 coupled to the movable shaft of electrical actuator 14. Link 100 is itself pivoted on a bracket 99 which is affixed to the frame of the aircraft, and actuator 14 is likewise affixed to the frame by a bracket 102.

With this setup, movement of actuator 14 so as to result in counterclockwise rotation of link 100 results in a mechanical movement of coupler 16 which retracts the spoilers, and clockwise rotation of link 100 results in deployment or extension thereof.

The central element of this portion of the system is the coupler 16, one embodiment of which is more fully illustrated in FIGS. 4 and 4A. The device therein comprises a commercially available clutchpak or no-back device which, as indicated above, gives the mechanical movement of speed brake levers 82 priority over the mechanical movement of electrical actuator 14. The mechanical movement of the former is connected to coupler 16 at pivot 92 thereof, and the latter at pivot 96 thereof.

The device comprises first and second quadrants 126 and 127 which are secured to a common shaft 124 by a retainer 125. Cable 94 is partially disposed within a groove 128 defined by upper and lower portions 130 of quadrant 126 and cable 95 is partially disposed within a groove 129 defined by upper and lower portions 131 of quadrant 127. Fastening means 132 and 133 provide support to the extremities of portions 130 and 131, and cables 94 and 95 have one end each affixed to the respective interior portions of quadrants 126 and 127.

The mechanical linkage illustrated in FIG. 3 is designed to deploy the spoilers when the shaft 124 is rotated in a clockwise direction, as viewed in FIG. 4. The rotation of shaft 124 from the input movements present at pivot points 92 and 96 is accomplished in the following manner. A bracket 117 and a sector 118, both defining an aperture 123 therethrough, are disposed on shaft 124. Sector 118 is freely movable about shaft 124, but bracket 117 is pinned thereto by suitable fastening means. A second bracket 112 is also fitted on shaft 124 atop bracket 117 and is likewise freely movable thereon. The assembly is maintained by a nut 110 which threadedly engages an upper portion of shaft 124.

Pivot point 92 is disposed in tow arms 113 of bracket 112. Bracket 112 also includes an extended arm 115 having right and left legs 115b and 115a descending therefrom, and a lower portion 116, including legs 116a and 116b which coact with portions of bracket 117 to be described.

Pivot point 96 is disposed in two arms 122 of sector 118. A semicircular arcuate ring 119 has its two legs pinned to opposite sides of sector 118. An arm 120 extends from bracket 117 to terminate in proximity to the inner edge of semicircular rim 119.

With particular reference now to FIG. 4A, coupling of the mechanical movements of bracket 117 and sector 118 is provided by a generally U-shaped device 121 which is pivoted about arm 120. Coupling of the mechanical movements of brackets 112 and 117 is accomplished by contact of the descending legs 116a and 116b with alternate sides of arm 120.

In detail, the U-shaped coupler 121 comprises a first portion 121a and a second portion 121b. Extending between the two halves of first portion 121a are pins 142 and 143 on opposite sides of rim 119, and extending between the two halves of second portion 121b are pins 141 and 144 which likewise engage rim 119. The two halves 121a and 121b are separated by a spring 150 so that pins 141-144 normally grasp rim 119 to lock its movement, and thus the movement of sector 118, to the movement of arm 120 and thus of bracket 117.

The aforementioned priority of the manual input present at pivot point 92 over the electrical input present at pivot point 92 is provided by the combination of arm 115 of bracket 112 and the aforementioned spring-loaded coupler 120. Specifically, leg 115b extends in proximity to portion 121a and leg 115a extends in proximity to portion 121b. A pin 146 is provided in leg 115a for engagement of portion 121b upon relative rotation thereof, and a pin 148 in leg 115b similarly engages portion 121a.

To deploy the spoilers as a speed brake by means of rotation of the speed brake handle causes the following movements to occur. As the speed brake handle 82 is rotated in a clockwise direction, rod 86, link 89, and rod 91 are moved in a direction so as to rotate bracket 112 in a clockwise direction. After a certain amount of lost motion, a pin 137 in leg 116b comes into contact with the right edge of arm 120 so that bracket 117 is thereafter rotated in the clockwise direction. Since bracket 117 is pinned directly to shaft 124, the quadrants 126 and 127 rotate in a clockwise direction to actuate the hydraulic actuators through cables 94 and 95. At the same time, pin 148 comes into contact with portion 121a, thereby rotating that portion about the pivot point on arm 120 against the force of spring 150. If the force exerted on portion 121a by pin 148 and thus by the pilot is greater than a predetermined minimum, such as 10 pounds, then the resultant rotation free pins 141—144 from contact with rim 119, and the electrical actuator 14 is disengaged from the spoiler actuator 20 and the speed brake lever 82.

When electrical actuator 14 provides a deploy or extend movement to pivot point 96, the lost motion occurs first between pin 148 and portion 121a and then between pin 137 and the right edge of arm 120. As long as the force at pin 148 is less than the predetermined minimum, pins 141-144 grip rim 119 to rotate bracket 117, and thus quadrants 126 and 127, and bracket 112 along with sector 118. In a like manner, when the spoilers are to be retracted and shaft 124 and quadrants 126 and 127 are to be rotated in a counterclockwise direction, counterclockwise input movements are provided to pivot points 92 and 96 and force coupling occurs between a pin 138 in leg 116b and the left edge of arm 120, and pin 146 and portion 121b.

If force is actually being applied to the pivot point 92 of the device in FIG. 4, which force is in excess of that predetermined minimum, then the force at point 92 is given priority over any force at point 96 in the following manner. If the pilot is rotating the speed brake lever 82 in a clockwise direction so as to cause a corresponding clockwise rotation of the quadrants 126 and 127 to deploy the spoilers as a speed brake, it will be remembered that pin 148 bears on portion 121a so that pins 141-144 are displaced from rim 119. If, during this clockwise rotation, the electrical actuator 14 provides a movement at pivot point 96 which tends to rotate sector 118 in a counterclockwise direction, rim 119 slips freely through the U-shaped member 121. Therefore, application of a restraining force at point 92, such as by the pilot holding or moving the speed brake lever, overrides any contrary motion of the sector 118 and rim 119 due to movement of the electrical actuator 14.

The device in fig. 4 also provides that the hydraulic actuator 20, or the linkage 19, cannot override the electrical actuator 14 when no force is applied to the pivot 92 by the speed brake lever 82, if the shaft of actuator 14 has been locked from movement. In one embodiment, the actuator shaft is electrically "braked" in either the fully extend or fully retract positions. If the actuator 20 or the linkage 19 attempt to back drive the speed brake system, such as by rotation of quadrants 126 and 127, pins 141-144 grip rim 119, which is locked, to prevent rotation of bracket 117 and thus of quadrants 126 and 127.

Actuation of the reverse thrust switch 10a in FIG. 2 may be accomplished by the mechanical linkage illustrated in FIGS. 5 and 6. FIG. 5 is a first cross section view taken of the control stand 76 of FIG. 3, and, more specifically, of either the No. 2 or No. 4 engine thrust control levers therein. The mechanism illustrated actuates the movable contact arm of switch 10a in response to the placing of either the No. 2 or No. 4 engine thrust control levers for reverse thrust. Since these engines are commonly on opposite wings of the aircraft, it is felt that sufficient redundancy is thereby provided to detect any reverse thrust condition. If desired, the mechanism illustrated in FIG. 5 and 6 could easily be extended to detecting reverse thrust for all the engines of the aircraft.

Now referring to FIG. 5, a lever 175 is disposed on a rotatable drum 178. Assuming that the No. 2 thrust control lever is illustrated, lever 175 rotates in slot 78 of FIG. 3. A separate reverse thrust lever 176 is disposed on lever 175, and is connected thereto by a suitable mechanism which permits the pilot to rotate the drum 178 to any reverse thrust position only if the pilot first rotates the thrust lever 175 to the idle stop position, then grasps the lever 176 to unlatch the drum so that rotation into the reverse thrust region may be made. Such a mechanism is commonly known and used and need not be described or illustrated.

In FIG. 5, the drum 178, engine thrust lever 175, and reverse thrust lever 176 are shown in three different positions. Position A corresponds to maximum forward thrust, position B to the idle stop position, and position C to reverse thrust. It will be noted that the drum 178 is rotated in the clockwise direction, as appearing in FIG. 5, for decreasing degrees of forward thrust and for increasing degrees of reverse thrust.

Disposed on the surface of drum 178 is a cam 179 which is shown in positions A', B', and C' which it occupies at positions A, B, and C of drum 178. A cam sensing mechanism is disposed adjacent to drum 178 and comprises a rotatable lever 181 which is pivoted at 182. On a first end of lever 181 is a roller 180 which is biased into engagement with the surfaces of drum 178 by a spring 184 attached to a second end of lever 181. Also supported on lever 181 is a second roller 183 which engages a tab 185 secured to a rotatable shaft 186. When the drum and levers are in positions A and B, lever 181 and shaft 185 take the position illustrated by solid lines in FIG. 5. However, when the drum 178 and corresponding levers are rotated by position C for reverse thrust, cam 179 travels to position C' so that lever 181 and shaft 185 are accordingly rotated in a clockwise direction to the position illustrated by dashed lines in FIG. 5.

Now considering FIG. 6, which is a second cross section view taken of the control stand 76, the various positions of the speed brake lever 82 are illustrated. In FIG. 6A, the speed brake lever 82 is situated at the extreme counterclockwise end of guide 85, or in the retracted position. Lever 82 includes a hollow, spring-loaded portion 82a which is located within a dog 83. When lever 82 is in position D, the spring in portion 82a pulls dog 83 down against a detent 85a of guide 85. In position D, therefore, speed brake lever 82 is locked from rotation.

In FIG. 6B, the speed brake lever has been placed in the arm position and in an extended position. When lever 82 is in position E, the pilot has raised lever 82 against the force of the spring within portion 82a so that dog 83 is raised above detent 85a, and has rotated lever 82 through an incremental angle from the retracted position D. This angle may be on the order of 3°, for example. When the lever 82 is in position F, the pilot has manually rotated lever 82 clockwise so that the spoilers are almost fully extended or deployed. A detent 85b at the extreme clockwise end of guide 85 defines the fully extended spoiler position.

In FIG. 6C, the speed brake lever 82 has been raised from its retracted position D by the action of the mechanical linkage of FIG. 5 including rotation of shaft 186. Specifically, shaft 186 extends throughout control stand 76 and, in the vicinity of the speed brake lever 82, has disposed thereon a link 190 which defines a pivot 191 at one end thereof. An adjustable link 192 couples pivot 191 to a pivot 193 of a latch 194. Latch 194 is pivoted about a point 196 and has disposed on the end opposite pivot 193 a detent surface 197 and a raising surface 198. Latch 196 is normally biased in the positions illustrated in FIGS. 6A and 6B by a spring 200 which is attached to the control stand at 199.

As shaft 186 rotates in a clockwise direction upon either the No. 2 or No. 4 thrust levers being placed in a reverse thrust setting, pivots 191 and 193 are moved downwardly so that detent surface 197 and raising surface 198 move the dog 83, and thus the portion 82a, upwardly. The degree of rotation of shaft 186 is sufficient so that dog 83 is moved completely out of detent 85a to position G. A pin 195 is also disposed on latch 194 and engages, upon completion of such rotation of shaft 186, the reverse interlock switch 10a. When that movement is made, the movable arm of reverse interlock switch 10a is placed in the reverse thrust position, as illustrated in FIG. 2. As discussed previously, a mechanical movement is then applied by the electrical actuator 14 through linkage 15, coupler 16, and linkage 18 to rotate the speed brake lever counterclockwise, and through linkage 19 to move the spoiler actuator 20 so that the spoilers are fully extended. In the course of this movement, speed brake lever 82 returns again through position F.

From this discussion, it can be noted that the mechanical linkage described provides an additional safeguard against inadvertent speed brake actuation. Since the dog 83 engages detent 85a when the lever is in the retracted position D, the electrical actuator cannot extend the speed brakes because of the restraining force transmitted through linkage 18 to coupler 16. Accordingly, the electrical actuator can deploy the speed brakes only if the pilot places the lever in the arm position E or if the pilot selects reverse thrust by rotation of a thrust control lever to the position C in FIG. 5, and the accompanying raising of latch 194 and speed brake lever 82 to position G in FIG. 6C.

Figure 7:
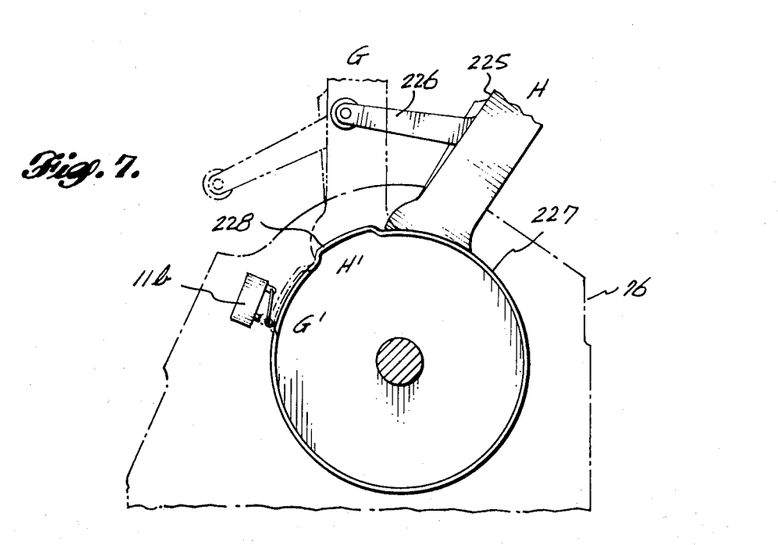
FIG. 7 is another section view of the control stand showing the construction and operation of another engine thrust lever sensor.

The forward thrust lever switch 11b may be situated as indicated in FIG. 7 which a third section taken of the control stand 76 showing the No. 3 engine thrust control lever. Specifically, a thrust lever 225 and reverse thrust lever 226 are disposed on a rotatable drum 227 which has disposed on the surface thereof a cam 228. Switch 116 is so disposed so that when the lever and drum are at the 50 percent thrust position G, cam 228 is at position G' and engages switch 11b to place the movable contact arm thereof in the greater than 50 percent thrust position. It will be noted that cam 228 is elongated so that for further counterclockwise rotation of the drum 227 past the 50 percent thrust position G, switch 11b remains actuated. Position H in FIG. 7 illustrates the idle stop position of the drum and thrust lever, and position H' the corresponding position of the cam 228.

The embodiments of the system elements illustrated in FIGS. 2–7 have proved to be a feasible and practical way of implementing the system of this invention for use in commercial aircraft. These embodiments are readily adaptable to existing mechanical speed brake linkages and provide in addition a redundancy of components and operations so that sufficient safeguards are provided to prevent inadvertent speed brake deployment or retraction during flight or landing maneuvers. However, it is to be clearly understood by those skilled in the art that the invention is not limited thereto, and is intended to be bounded only by the limits of the appended claims.

We claim:

1. A system for use with aircraft having a means for propulsion, a landing gear, and an air speed brake system including at least one spoiler and an actuating means therefor, comprising:
   a. a first sensor means providing a control signal when the propulsion means is controlled to furnish reverse propulsion,
   b. a second sensor means providing a control signal when engagement is made between the landing gear of the aircraft and ground,
   c. a logic means connected to said first and second sensor means for providing a deploy output signal only when control signals are being provided by both said first and second sensor means, and
   d. means transmitting said deploy output signal to the actuating means to deploy the spoiler as a speed brake.

2. A system as recited in claim 1 for use in an aircraft having a plurality of landing gears on each side thereof wherein said second sensor means includes:
   a. a source of a reference signal,
   b. a plurality of switching means, each of said switching means being disposed to coact with landing gear so that said switching means is actuated when contact is made between the ground and the corresponding landing gear, and
   c. means connecting said plurality of switching means to each other and to said source of reference signal so that said control signal is provided therefrom only if at least one switching means on each side of the aircraft is actuated upon landing.

3. A system as recited in claim 1 further comprising:
   a. a third sensor means providing a first control signal when the propulsion means is controlled to furnish forward propulsion equal to or less than a predetermined amount, and providing a second control signal when the propulsion means is controlled to provide forward propulsion in excess of said predetermined amount, b. said logic means being connected to said third sensor means and providing said deploy output signal only when control signals are being provided by both said first and second sensor means and said first control signal is being provided by said third sensor means, and c. said logic means further providing a retract output signal to the actuating means through said transmitting means to retract the spoiler when said second control signal is being provided by said third sensor means.

4. A system as recited in claim 3 for use in an aircraft having a plurality of landing gears on each side thereof wherein said second sensor means includes:

a. a source of a reference signal, b. a plurality of switching means, each of said switching means being disposed to coact with a landing gear so that said switching means is actuated when contact is made between the ground and the corresponding landing gear, and c. means connecting said plurality of switching means to each other and to said source of reference signal to that said control signal is provided therefrom only if at least one switching means on each side of the aircraft is actuated upon landing.

5. A system as recited in claim 3 wherein said logic means further comprises:

a. an extend relay and a retract relay, each of said relays including a coil and at least one terminal upon which appear said deploy and retract output signals when the coil thereof is energized, respectively, b. means connecting the control signals from said first and second sensor means and the first control signal from said third sensor means to the coil of said extend relay, and c. means connecting the second control signal from said third sensor means to the coil of said retract relay.

6. A system as recited in claim 5 wherein each of said first, second and third sensor means comprises:

a. source of signal voltage, and b. a switch having said source coupled thereto and providing said control signal at its output.

7. A system as recited in claim 3 wherein said transmitting means includes an electrical actuator providing mechanical movements in response to said deploy and retract output signals.

8. A system as recited in claim 7, as adapted to actuate the spoiler either automatically or manually, a. further comprising a speed brake lever situated as to be manipulated by an operator of the aircraft, said lever being rotatable between two positions which correspond to extension and retraction of the spoiler and providing mechanical movements corresponding to said rotation, and b. said transmitting means coupling the mechanical movements of said speed brake lever and of said electrical actuator to the actuating means for the spoiler, said transmitting means giving he mechanical movement of said lever priority over those of said electrical actuator.

9. A system as recited in claim 8:

a. further comprising a fourth sensor means operative to provide a first control signal when said speed brake lever is in the retract position and to provide a second control signal when said speed brake lever has been rotated therefrom by an incremental amount, and b. wherein said logic means is also connected to said fourth sensor means and provides a deploy output signal when control signals are being provided by said first and second sensor means and when said first control signals are also being provided by said third and fourth sensor means, or when said control signal is being provided by said second sensor means, said first control signal is being provided by said third sensor means and said second control signal is being provided by said fourth sensor means.

10. A system as recited in claim 8:

a. further comprising a guide on which said speed brake lever rotates, said guide including a detent portion which engages said lever to restrain it from rotation when said lever is in the retract position, and b. said first sensor means further including a rotatable latch member having one end engaging said speed brake lever and being operative to move said lever out of engagement with said detent portion of said guide when the propulsion means is controlled to furnish reverse propulsion.

11. A system as recited in claim 5, further comprising means removing said deploy output signal from the terminal of said extend relay when retract relay is energized by said second control signal from said third sensor means.

* * * * *